J. VAN W. REYNDERS.
TESTING MACHINE.
APPLICATION FILED OCT. 29, 1908.

955,202.

Patented Apr. 19, 1910.

3 SHEETS—SHEET 1.

J. VAN W. REYNDERS.
TESTING MACHINE.
APPLICATION FILED OCT. 29, 1908.

955,202.

Patented Apr. 19, 1910.
3 SHEETS—SHEET 2.

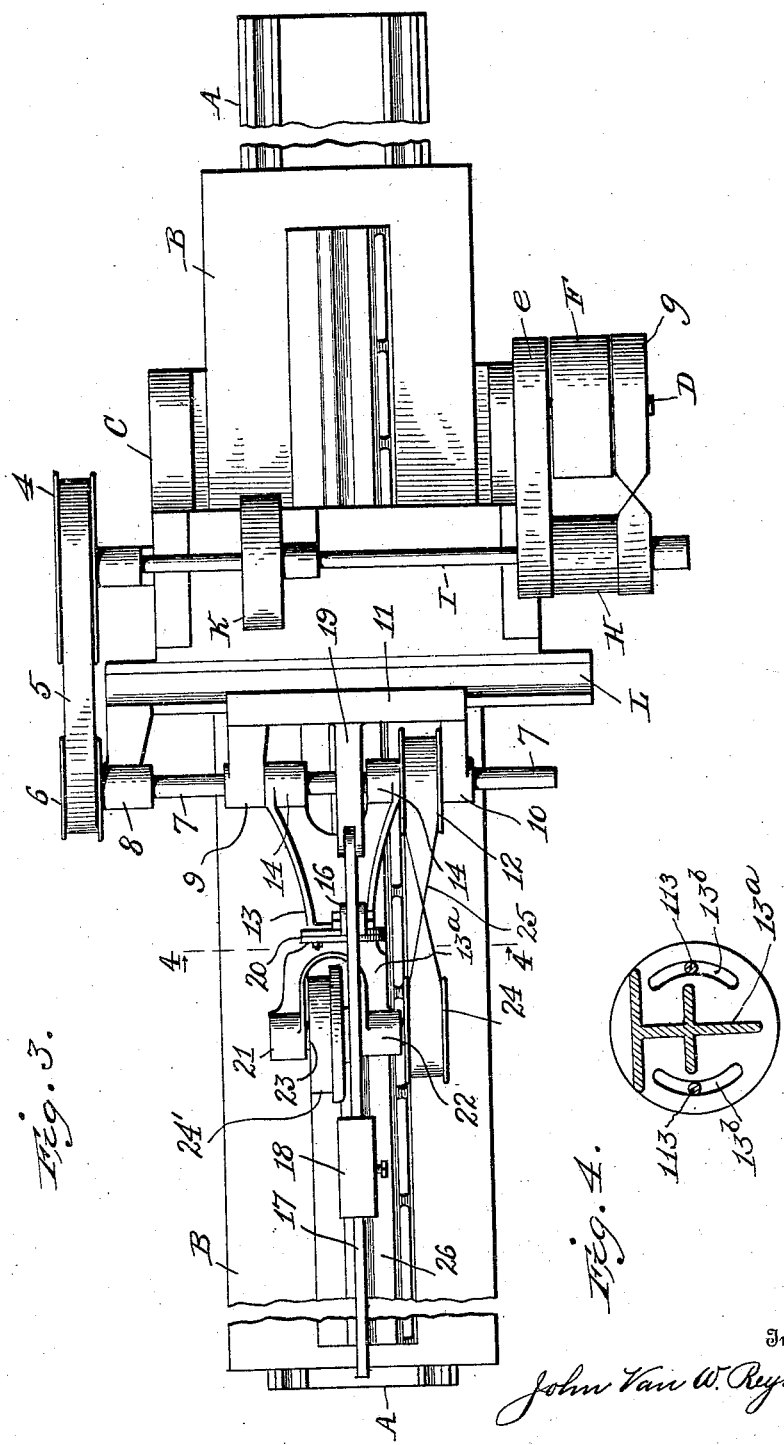

UNITED STATES PATENT OFFICE.

JOHN VAN WICHEREN REYNDERS, OF STEELTON, PENNSYLVANIA, ASSIGNOR TO THE PENNSYLVANIA STEEL COMPANY, OF PHILADELPHIA, PENNSYLVANIA, A CORPORATION OF PENNSYLVANIA.

TESTING-MACHINE.

955,202. Specification of Letters Patent. Patented Apr. 19, 1910.

Application filed October 29, 1908. Serial No. 460,082.

*To all whom it may concern:*

Be it known that I, JOHN VAN WICHEREN REYNDERS, a citizen of the United States, residing at Steelton, county of Dauphin, State of Pennsylvania, United States of America, have invented certain new and useful Improvements in Testing-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to machines for testing the relative resistance to wear of materials, and has for its object to subject a plurality of portions or sections of such material to like wearing conditions and is particularly applicable to testing the wear of railway rails, said rails, or portions of rails, being reciprocated while in contact with the wearing element, this wearing element being preferably, but not necessarily, a suitably mounted railway car wheel.

Figure 1:
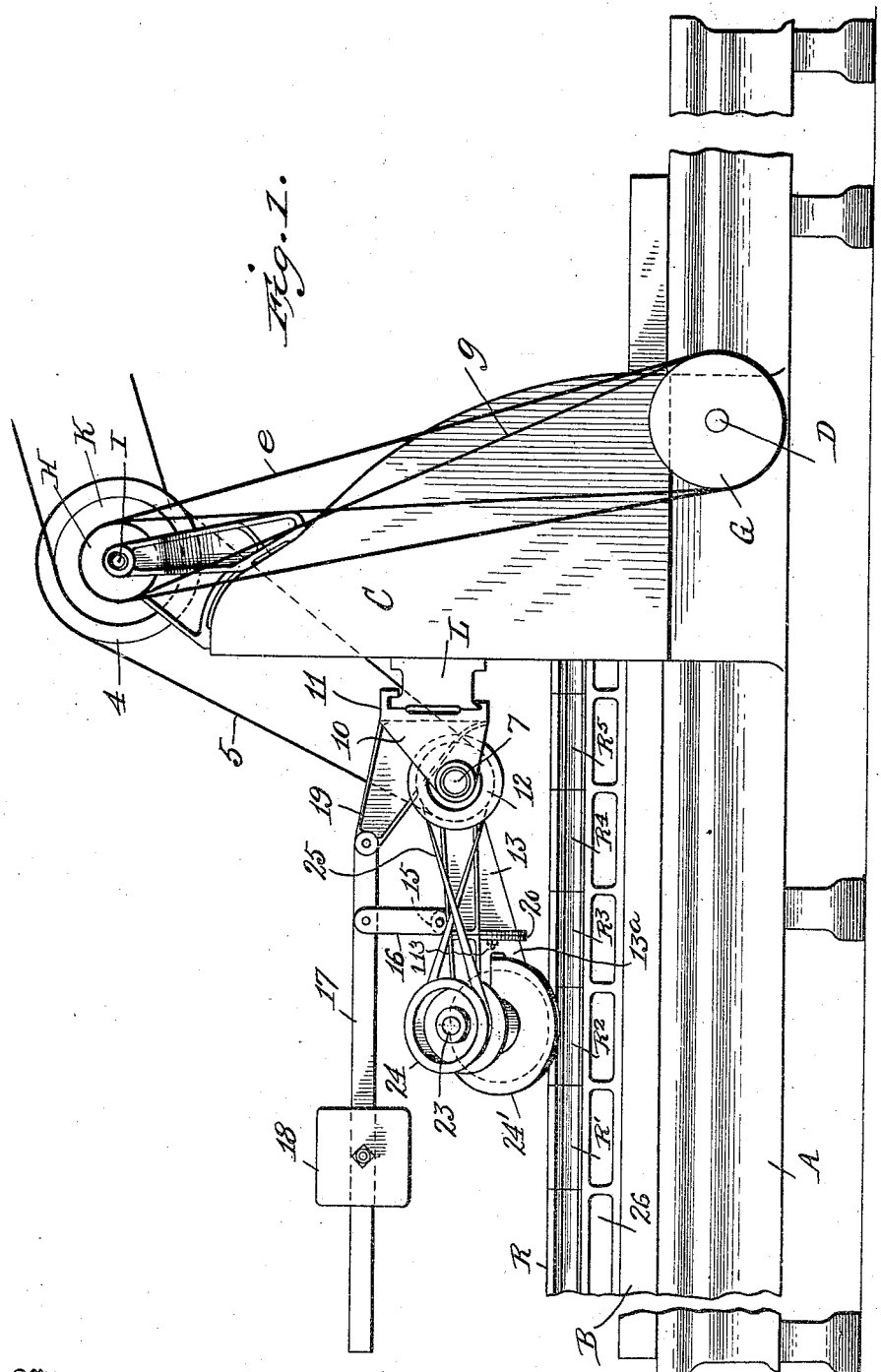
Figure 2:
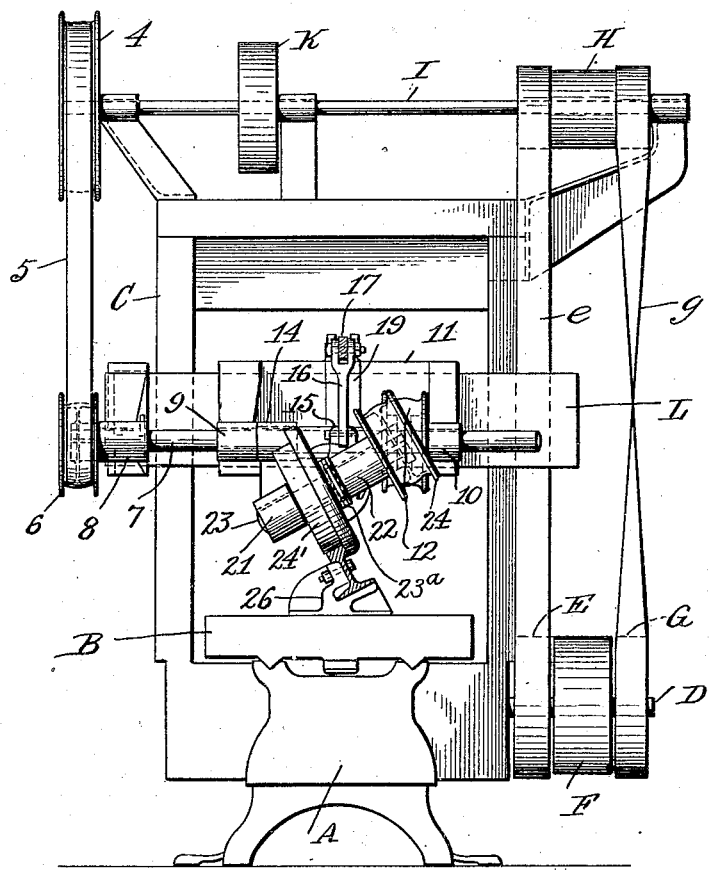

Referring to the drawings in which like parts are similarly designated, Figure 1, is a side elevation of a testing machine embodying my invention. Fig. 2, a front elevation. Fig. 3, a plan of the machine showing the car-wheel support in horizontal position, instead of in inclined position as in Figs. 1 and 2. Fig. 4 is a section on line 4—4 of Fig. 3 of the forward adjustable portion of the two part arm.

The machine comprises a frame A on which is mounted a horizontal bed B reciprocating between lateral, vertical standards C. On the base or frame A is secured a shaft D on which is mounted a loose pulley F situated between adjacent fast pulleys E and G, and there is a belt *e* and a crossed belt *g* to a drum H, mounted on a shaft I, which shaft is the main driving shaft of the machine, being driven by a pulley K. The power is applied to pulley K by a suitable belt. A vertically adjustable cross rail L is mounted on the standards C above the bed.

The structure so far described is similar to well known machine tools having reciprocating beds, and that have suitable mechanism timed for reciprocating the bed, the detailed structure of which is well known and forms no part of this invention. These features may be varied as desired, an essential structure for the purposes of this invention being a reciprocable bed.

On the shaft I is pulley 4, belted by a belt 5 to a pulley 6, the latter mounted on a shaft 7, supported in bearings 8, 9 and 10. The bearings 9 and 10 are formed on a saddle 11, which is slidably mounted on the cross rail L to permit lateral adjustment, so that the bearings 9 and 10 are moved simultaneously with the saddle when it is laterally adjusted. On shaft 7 is secured a pulley 12 that rotates with said shaft. Free to swing with respect to the shaft 7 is a swinging arm 13 having ears or bearings 14 at one end through which shaft 7 passes. These bearings 14 are adjacent and between those 9 and 10 on the saddle, or otherwise, and the arm is provided on its top and intermediate its ends with lugs 15 between which is pivotally secured the lower end of a link 16, whose upper end is pivotally connected to a lever arm 17 carrying an adjustable weight 18, and pivoted in the ears of a bracket 19 projecting from the saddle 11. The swinging arm 13 carries at its free end a support 13ª for the wearing element, said arm and support being provided with circular abutting plates 20 adjustably connected together in a manner to permit the support to be positioned at any angle with respect to the arm.

In one of the circular abutting plates 13 are secured bolts 113 that project through arcuate slots 13ᵇ, Fig. 4, in the companion circular plate or end of the support 13ª or vice versa, whereby said arm and support are secured together. The support 13ª has two spaced bearings 21 and 22, supporting a shaft 23 carrying a belt pulley 24, belted by a belt 25 to the pulley 12 fast on shaft 7. On the shaft 23 is mounted a wearing element, shown in the drawings as a car-wheel 24′ and preferably, but not necessarily a thrust ball bearing 23ª, both the bearing 25 and the wheel 24′ being between the bearings 21 and 22.

I have shown secured to the reciprocating bed B of the machine a chuck 26 forming a continuous inclined support in which are secured a plurality of alined sections of rails R, R′ R², etc. This chuck is here shown of such form as to hold the sections of rail in inclined position. The inclination of the alined sections of rail is varied by supporting them in other chucks having the desired inclination or in any other suitable manner.

The operation of the testing machine is as follows: Rail sections R, R', R² etc., two or more in number are placed in alinement so that their contact surfaces with the wearing element or car-wheel 24' are in a substantially straight line, and in the drawings I have shown these rail sections mounted in a chuck 26 in an inclined position, so as to produce a wear against the side of the head of the rail by the flange of the wheel as well as on the top of the rail by its tread. The manner and character of mounting the rails are quite immaterial so long as they are held in a relation to the reciprocating bed B, on which they are mounted, at that angle at which the test is desired to be made. In the present instance, the rail sections R are held inclined and the wheel 24' is held in a similarly inclined position by adjusting the support 13ª with respect to the swinging arm 13 by means of bolts 113 held in one of the abutting plates and projecting through the arcuate slots 13ᵇ in the other plate. The desired weight or load on the wheel is obtained by means of the adjustable weight 18 on arm 17 acting through link 16 to load the swinging arm 13. Power is applied to pulley K by means of a belt or other suitable device which transmits movement through the shaft I, and belt or belts e or g to the fast pulleys E or G, there being suitable and well known mechanism for shifting the belts to and from loose pulley F on shaft D that actuates the means to reciprocate the bed B of the machine.

Any suitable counting mechanism may be fitted to a reciprocable part of the machine in order to count the number of movements that the rails to be tested are making or have made. The tops of the rails being in alinement, the wheel travels over all of them whether they be of the same profile or not, and thus subjects all the rail sections mounted on the bed to the same conditions of wear, and thereby determines the relative wearing qualities of the different grades of material of which the rail sections are made.

It is not necessary under all conditions that the wheel 24' be driven and in those cases one or both of the belts 5 and 25 may be removed. In place of the car-wheel 24' any other wearing element may be substituted.

I claim:

1. In a testing machine, the combination with a reciprocable bed; of a swinging arm, means on said arm to support a rotatable wearing element, means by which said supporting means may be adjusted and held in its adjusted position, supporting means for said arm to permit movement thereof with respect to the bed, and means to drive said element.

2. In a testing machine, the combination with a reciprocable bed; of a swinging arm, means on said arm to support a rotatable wearing element, means by which said supporting means may be adjusted and held in its adjusted position, supporting means for said arm to permit movement thereof with respect to the bed, means to drive the wearing element and means to load the arm.

3. In a testing machine, the combination with a reciprocable bed; of a saddle adjustable transversely of the bed, an arm pivoted in said saddle to swing vertically, supporting means on said arm, a rotatable wearing element mounted in the supporting means, means by which the angularity of the supporting means is adjusted and so held, means to drive the wearing element and means to load the arm.

4. In a testing machine, the combination with a reciprocable bed and a cross rail above the same; of a saddle adjustable along the rail transversely of the bed, a shaft supported from said rail and saddle, an arm pivoted on said shaft at the saddle, a support on said arm, means by which the support is adjusted with respect to the arm and held in its adjusted position, a short shaft carried by the adjustable support, a belt pulley on each of said shafts, a belt connecting the pulleys, a lever arm pivotally supported from the saddle connected to the arm and a weight adjustable along said lever arm.

5. In a testing machine, the combination with a reciprocable bed and a cross rail above the same, of a saddle adjustable along the rail transversely of the bed, a shaft rotatably mounted in journals formed on the saddle, an arm pivoted on the shaft between said journals having a circular plate on its free end, a forked supporting member having a circular plate provided with arcuate slots for the reception of bolts on the plate of the pivoted arm, a short shaft journaled in the fork of said supporting member, a belt pulley on each of said shafts, a belt connecting the pulleys, a wheel fixed on the short shaft, a bracket formed on the saddle, a lever pivoted in the bracket extending over the arm, a link connecting the lever and arm and a weight adjustably mounted on the lever.

In testimony that I claim the foregoing as my invention, I have signed my name in presence of two subscribing witnesses.

JOHN VAN WICHEREN REYNDERS.

Witnesses:
GEO. W. PARSONS,
ALBERT F. LEEDS.